United States Patent [19]

Young et al.

[11] Patent Number: 5,225,082
[45] Date of Patent: Jul. 6, 1993

[54] HYDROCYCLONE WITH FINELY TAPERED TAIL SECTION

[75] Inventors: Grant A. Young; Davis L. Taggart, both of Tulsa; David G. Hild, Broken Arrow; David W. Simms; J. Robert Worrell, both of Tulsa, all of Okla.

[73] Assignee: Amoco Corporation, Chicago, Ill.

[21] Appl. No.: 828,271

[22] Filed: Jan. 30, 1992

[51] Int. Cl.$^5$ ............................................. B01D 21/26
[52] U.S. Cl. ................................. 210/512.1; 210/787; 209/144; 209/211; 55/459.1; 55/459.5
[58] Field of Search ........................... 210/512.1, 787; 209/144, , 211; 55/459.1, 459.5

[56] References Cited

U.S. PATENT DOCUMENTS 5,045,218  9/1991  Prendergast et al. ............... 210/787
5,071,556  12/1991  Kalnins et al. ................... 210/512.1

Primary Examiner—Robert A. Dawson
Assistant Examiner—David Reifsnyder
Attorney, Agent, or Firm—Richard A. Kretchmer; Frank J. Sroka

[57] ABSTRACT

A hydrocyclone separator for separating oil from water includes a substantially cylindrical first portion with a central overflow outlet and at least one tangential flow inlet, at least one converging section, and a tail portion with a central underflow outlet having a substantial length thereof characterized by a slight taper in the range of 1 to less than 15 degree-minutes.

20 Claims, 8 Drawing Sheets

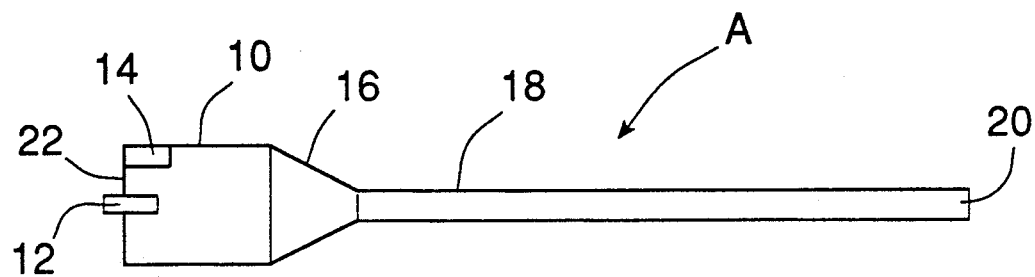
Fig. 1A - Prior Art
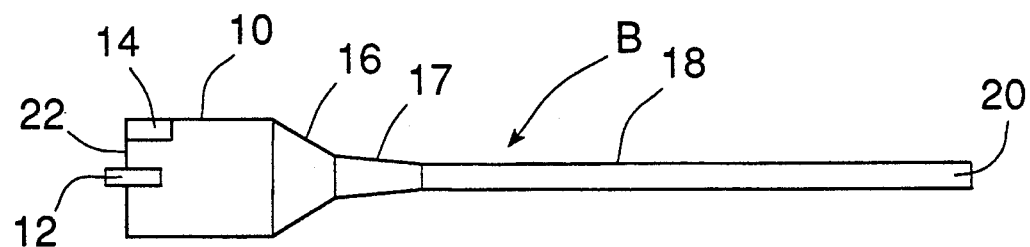
Fig. 1B - Prior Art

HYDROCYCLONE WITH FINELY TAPERED TAIL SECTION

FIELD OF THE INVENTION

The invention is in the field of separation technology; and particularly in the field of oil-water separation hydrocyclones.

SETTING OF THE INVENTION

Hydrocyclones are used to separate fluids and solids from other fluids. In particular, hydrocyclones can efficiently separate oil from water.

One configuration of hydrocyclone used in the separation of oil from water is characterized by an underflow outlet portion having a cylindrical tail section long relative to its entrance diameter. The initial portion of such a hydrocyclone is variously configured but typically has one or more cylindrical portions having a fluid-mixture inlet and an overflow outlet and one or more generally conical portions converging in the direction of the underflow outlet.

SUMMARY OF THE INVENTION

In the operation of hydrocyclones having an underflow outlet portion having a long cylindrical tail section, it has been observed, even where less dense fluid such as oil is effectively separated to the center of the swirling fluid, that at excessive lengths the separated fluid is not returned to the overflow outlet of the hydrocyclone, even in the presence of back pressure provided by means external to the underflow outlet.

By providing in the long tail section of such a hydrocyclone an extended very fine taper converging in the direction of the underflow outlet and having a half angle $\alpha_u$ in the range of 1' (1 degree-minute or 1/60 degree) to less than 15' (15 degree-minutes or $\frac{1}{4}$ degree), it is possible to maintain angular momentum of the swirling fluid over very long $l_u/d_u$ ratios and also to produce an axial flow profile in the hydrocyclone such that the less dense fluid is caused to flow to the overflow outlet of the hydrocyclone.

BRIEF DESCRIPTION OF THE FIGURES

FIGS. 1A and 1B, labeled PRIOR ART, illustrate first and second embodiments of hydrocyclones according to the prior art.

NOTATION

Figure 2A:
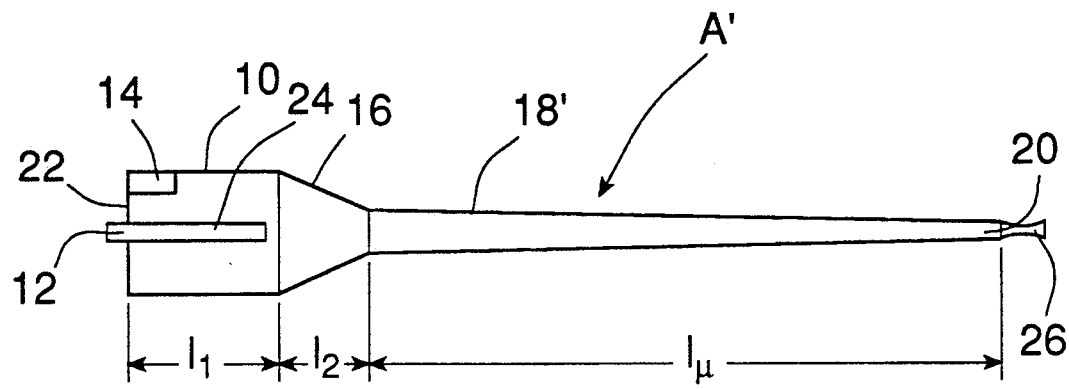
FIGS. 2A and 2B illustrate the embodiments of FIGS. 1A and 1B respectively, but having finely tapered tail section 18' in place of cylindrical tail section 18.

The following notation is used:
- d = cross sectional diameter of hydrocyclone, or part thereof, perpendicular to the long axis of the hydrocyclone;
- l = length of hydrocyclone, or part thereof, parallel to the long axis;
- α = angle of convergence of hydrocyclone, or part thereof, toward underflow end measured as the acute angle that a tangent to a point on the interior sidewall of the hydrocyclone makes in converging toward the long axis of the hydrocyclone, the tangent being in the same plane as the long axis; for conical sections, α is equal to one-half the total included cone angle.

Specifically,
- $d_o$ = diameter of overflow outlet 12
- $d_i$ = diameter of a circle having the same cross-sectional area as tangential inlet 14 regardless of shape
- $d_c$ = diameter of cylindrical portion 10
- $d_u$ = diameter of underflow outlet 20 before choke 26
- $d_{ue}$ = entrance diameter, at juncture with converging portions 16 or 17, of cylindrical section 18 or tapered section 18'
- $l_c$ = length of cylindrical portion 10
- $l_1$ = length of converging portion 16
- $l_2$ = length of converging portion 17 (if present)
- $l_u$ = length of portion 18 or 18'
- $\alpha_1$ = angle of convergence of converging portion 16
- $\alpha_2$ = angle of convergence of converging portion 17
- $\alpha_u$ = angle of convergence of portion 18 or 18'

DETAILED DESCRIPTION OF THE INVENTION

FIG. 1A—Prior Art Illustrates a prior art hydrocyclone A such as described in U.S. Pat. No. 4,964,994. Cyclone A has a cylindrical first portion 10 having a central overflow outlet 12 in a first end piece 22 at a first end, and at least one tangential flow inlet 14 adjacent the first end. A second end of cylindrical portion 10 is continuous with a second, converging portion 16 which is in turn continuous with a third cylindrical portion 18 having a central underflow outlet 20.

FIG. 1B—Prior Art illustrates a prior art hydrocyclone B. Like hydrocyclone A, hydrocyclone B has a cylindrical first portion 10 and a coaxial cylindrical third portion 18. Between sections 10 and 18 are two generally conical converging portions 16 and 17. Other reference numerals are the same as for FIG. 1A.

DETAILED DESCRIPTION OF THE PREFERRED EMBODIMENTS

Figure 2B:
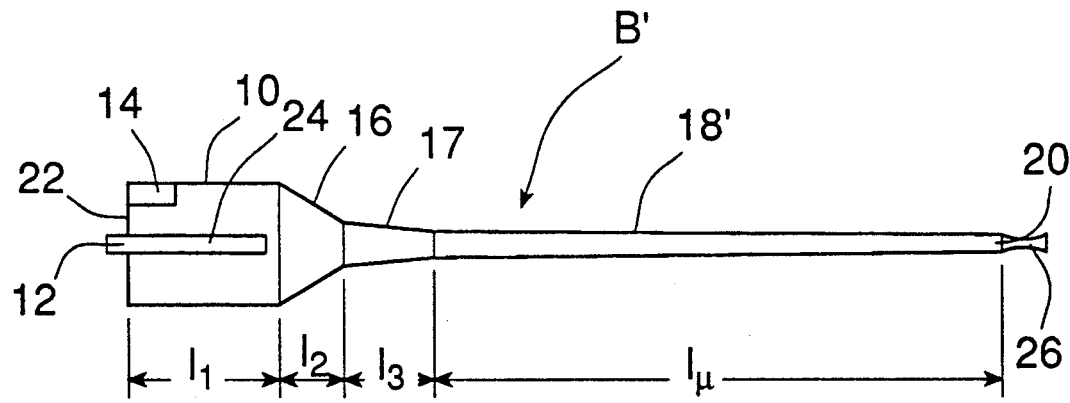

According to the invention, as shown in FIGS. 2A and 2B, at least one-third and preferably all of portion 18' is characterized by a fine taper in the range of 1 degree-minute to less than 15 degree-minutes. The finely tapered portion is preferably situated in section 18 at or ahead of the point along cylindrical section 18 beyond which further length in the direction of the underflow outlet does not improve separation.

The preferred configuration of the hydrocyclone separator of FIG. 2A is as follows:

$$d_o < d_u < d_c$$

$$0.1 \leq d_i/d_c \leq 0.5$$

$$0.01 \leq d_o/d_c \leq 0.20$$

$$0 \leq l_c d_c \leq 2.0$$

$$0.1 \leq d_u/d_c \leq 0.5$$

$$1.5' \div \alpha_1 \leq 15°$$

$$1' \leq \alpha_u < 15'$$

$$50 < l_u/d_{ue}$$

As shown by EXAMPLE III and EXAMPLE IV below, an improvement can be obtained even where only a portion of section 18' is finely tapered, and even for sections 18' whose length/entrance diameter ratio is less than 50. As used herein, entrance diameter is a diameter of a given section of a hydrocyclone measured where the section is closest to first-end piece 22.

Preferably, the $l_u/d_{ue}$ ratio is 30 or greater for good separation; more preferably 50 or greater since at ratios of $l_u/d_{ue}$ ratios of 50 and more, further separation of oil from water has been found not to occur in the absence of a taper.

Broadly the portion of $l_u$ which is characterized by the fine taper can be any portion effective to improve separation of oil from water compared to a cylindrical section of zero taper. The gradual and extended character of the taper, however, are considered important to maintain and enhance separation by overcoming drag losses without creating excessive turbulence. At least one-third or one-half or more is characterized by the fine taper; most preferably all or substantially all of $l_u$ is characterized by the fine taper convergence.

Generally, the angle $\alpha_u$ can be in the range of about 1' (1/60°) to less than 15' (¼°). It is expected for taper angles of 15' and larger for long-tail sections, i.e., $l_u/d_{ue} \geq 50$, that the increased taper will result in excessively small underflow diameters and large pressure drops or cause excessive turbulence or both, particularly with regard to droplets of the very fine size whose recovery to the overflow outlet is essential to the highest separation efficiencies. Preferably, $\alpha$ is in the range of 1' to 11'; most preferably in the range of 3' to 11'.

In the utilization of hydrocyclone separators, the engineer is usually given the produced oil concentration and the oil-in-water stream's production flow rate. From that point, the engineer determines the size and number of hydrocyclone separators needed to achieve maximum oil separation efficiency. In an offshore platform environment, the flow rates per hydrocyclone are usually between about 10 and about 100 gpm (gallons-per-minute). The performance of hydrocyclone separators will be described in the context of this range of flow rates. However, flow rates less than or greater than this range can easily be accommodated by using multiple hydrocyclones.

As shown in FIG. 2A, a hydrocyclone separator of the present invention can include a substantially cylindrical first portion 10 having a central overflow outlet 12 at a first end thereof, and has at least one tangential flow inlet 14 adjacent the first end thereof. A second end of the substantially cylindrical first portion 10 converges into a conical second portion 16 which in turn converges into a cylindrical third portion 18, which has a central, oppositely located underflow outlet 20. The cylindrical first portion 10 is not necessarily present, and the overflow outlet 12 and flow inlet(s) 14 can be provided in the conical second portion 16, as is well known. The hydrocyclone separator can be assembled from multiple separate parts. Preferably, the hydrocyclone separator is molded as a single unit from PVC (polyvinylchloride) or polyurethane or other similar material. Further, the hydrocyclone separator can be a rigid, self-supporting unit or can be contained within a shell (not shown).

Tangential flow inlet 14 introduces the oil and water stream into the cylindrical first portion 10 or into the conical second portion 16 in a manner such that the stream will start to spiral. One tangential flow inlet 14 can be utilized, or a plurality of tangential flow inlets 14 can be utilized in the same plane or in a spaced relationship to one another. Flow inlet 14 can have an elongated shape, such as a rectangle, oval or the like and the entry can be tangential or involute. The diameter $d_i$ of tangential flow inlet 14 is sized for the desired flow rate and to minimize droplet degradation. For most applications, the ratio $0.1 \leq d_i/d_c \leq 0.5$ has been found to be satisfactory with $0.24 \leq d_i/d_c \leq 0.35$ being preferred.

The diameter $d_c$ of the cylindrical portion 10 should be small relative to the overall length of the hydrocyclone separator to increase separation efficiency. First portion 10 can have an internal cone angle or taper the same as or less than the cone angle $\alpha_1$. For the purposes of the embodiment of the present invention, it is assumed that the cylindrical first portion 10 is preferably in the form of a right cylinder (0° taper). Further, it has been found that the length $l_c$ of the cylindrical first portion 10 should be as short as possible because little separation actually occurs within the cylindrical first portion 10 and it is beneficial to reduce the frictional drag caused by its surface area. In fact, the cylindrical first portion 10 can be eliminated so that the inlet 14 is within the conical second portion 16. Ratios of $l_c/d_c$ from 0 to approximately 2 have been found to provide effective separation efficiency.

The central overflow outlet 12 is usually a cylindrical opening in an upper panel 22 of the cylindrical first portion 10 or it can include an oil-finding tube or vortex finder 24 which extends part way into and is coaxial with the cylindrical first portion 10. Preferably the vortex finder has a length within the hydrocyclone about equal to $l_c$. The diameter $d_o$ of the oil-finding tube 24 and/or the opening 12 determines the flow split for a given backpressure of fluid (i.e., the amount of fluid (oil and water) removed from the overflow outlet compared to the amount of fluid discharged out the underflow outlet). The smaller the diameter of the outlet 12 the less maximum amount of oil or separated gas is permitted to pass out from the overflow of the hydrocyclone separator. The larger the diameter of the overflow outlet 12, the greater the maximum amount of oil is removed. When less than the maximum amount of oil is separated out the overflow, water discharges out the overflow to replace the oil.

The flow of fluid exiting the first portion 10 enters the conical second portion 16 where the cone angle $\alpha_1$ causes the fluid to spin more rapidly. The spin velocity increase results in greater forces on the oil droplets resulting in the droplets moving to the center and a separation being made. The transition from the first portion 10 to the second portion 16 can be an abrupt change from a cylinder to a gradual slope change or curve to facilitate the smooth spiralling flow of the fluid into and through the conical second portion 16.

The cone angle $\alpha_1$ can vary across the length of the conical second portion 16, but an essentially straight conical section has been found to perform well. A single optimum cone angle $\alpha_1$ is approximately equal to $3°$. This cone angle ($\alpha \approx 3°$) appears to provide the best balance of spin velocity and surface area for the usual ranges of flow rate (gpm). However, cone angles $\alpha_1$ from about $1.5°$ to about $15°$ are preferred.

The finely tapered third portion 18' is connected to second portion 16. It can have a slight internal angle of from about 1 minute to less than 15 minutes. Third portion 18' can include a bend or a curve to facilitate space saving in a particular implementation. However, it is expected that maximum separation efficiency will occur when the third portion 18' is in the form of a straight finely tapered tail section.

Through various experiments, the length to entrance diameter $l_u/d_{ue}$ ratio of third portion 18' has been found to have a critical relationship to the length of finely tapered tail section 18'. Specifically, at $l_u/d_{ue}$ ratios >- about 50, no additional separation occurs in the absence of the finely tapered tail section. Therefore, the finely tapered portion is preferably placed at or preceding the corresponding point in section 18' where no further improvement in separation efficiency is accomplished by additional length of a cylindrical section 18.

Further, the diameter $d_u$ of the underflow outlet 20 has been found to be important in relation to $d_c$, because if too large of an underflow outlet diameter $d_u$ is used, then the spin velocity in this section is reduced resulting in poorer separation. In general, testing has shown that a smaller diameter third portion 18 is desired to take advantage of the flow exiting the conical second portion 16. Ratios of $0.1 \leq d_u/d_c \leq 0.5$ have been found to provide good separation efficiency. Ratios of $0.16 \leq d_u/d_c < 0.42$ have been found best over the given flow rates.

As shown in FIGS. 2A and 2B by dashed lines at reference numeral 26, a choke may optionally be used downstream of the underflow outlet 20 of finely tapered tail section 18'. A choke is a reduction in underflow diameter which occurs over a relatively small distance, typically, over ⅓, 1/6, or less of the length of tapered tail section 18'. Chokes of 6 inches length and representing a reduction of underflow diameter of 1/10 or 1/5 have shown good effect. Greater or lesser reductions in underflow diameter are also expected to be beneficial. Preferably, the change in diameter occurs smoothly and gradually rather than as a step-change; however, a step-change can also be used.

Referring now to FIG. 2B, hydrocyclone B preferably has the following general characteristics:

$d_o < d_u < d_c$ $0.1 \leq d_i/d_c \leq 0.5$ $0.01 \leq d_o/d_c \leq 0.2$ $0 \leq l_c/d_c \approx 2.0$ $0.1 \leq d_u/d_c \leq 0.5$ $1.5° \leq \alpha_1 \leq 15°$ $20' \leq \alpha_2 \leq 2°$ $1' \leq \alpha_u < 15'$ $50 < l_u/d_{ue}$ The finely tapered tail section 18' can be as described above for the embodiment of FIG. 2A.

The following EXAMPLES further illustrate the invention. All hydrocyclones tested, whether generally characterized by the configuration of FIG. 1A, 1B, 2A, or 2B, utilized a vortex finder 26 as illustrated in FIGS. 2A and 2B.

EXAMPLE I

Three hydrocyclones having the configuration of FIG. 1A, i.e., having a zero-taper tail section 18, are characterized by $d_i/d_c = 0.25$, where $d_i = \sqrt{4A1/\pi}$ and $A_i$ is the area of inlet 14, $d_o/d_c = 0.026$, $\alpha_1 = 3°$, $l_s d_c = 1$, and $d_u/d_c = 0.33$.

The three hydrocyclones have different $l_u/d_{ue}$ ratios as follows:

| Cyclone | $l_u/d_c$ | $l_u/d_{ue}$ |
| --- | --- | --- |
| 1 | 12 | 36 |
| 2 | 18 | 54 |
| 3 | 24 | 72 |

A dispersion of Bumpass crude oil in fresh water, means oil droplet size 35 microns, is introduced into each hydrocyclone over a range of flow rates. The percentage of contained oil separated is determined. The results are shown in FIG. 3.

Figure 3:
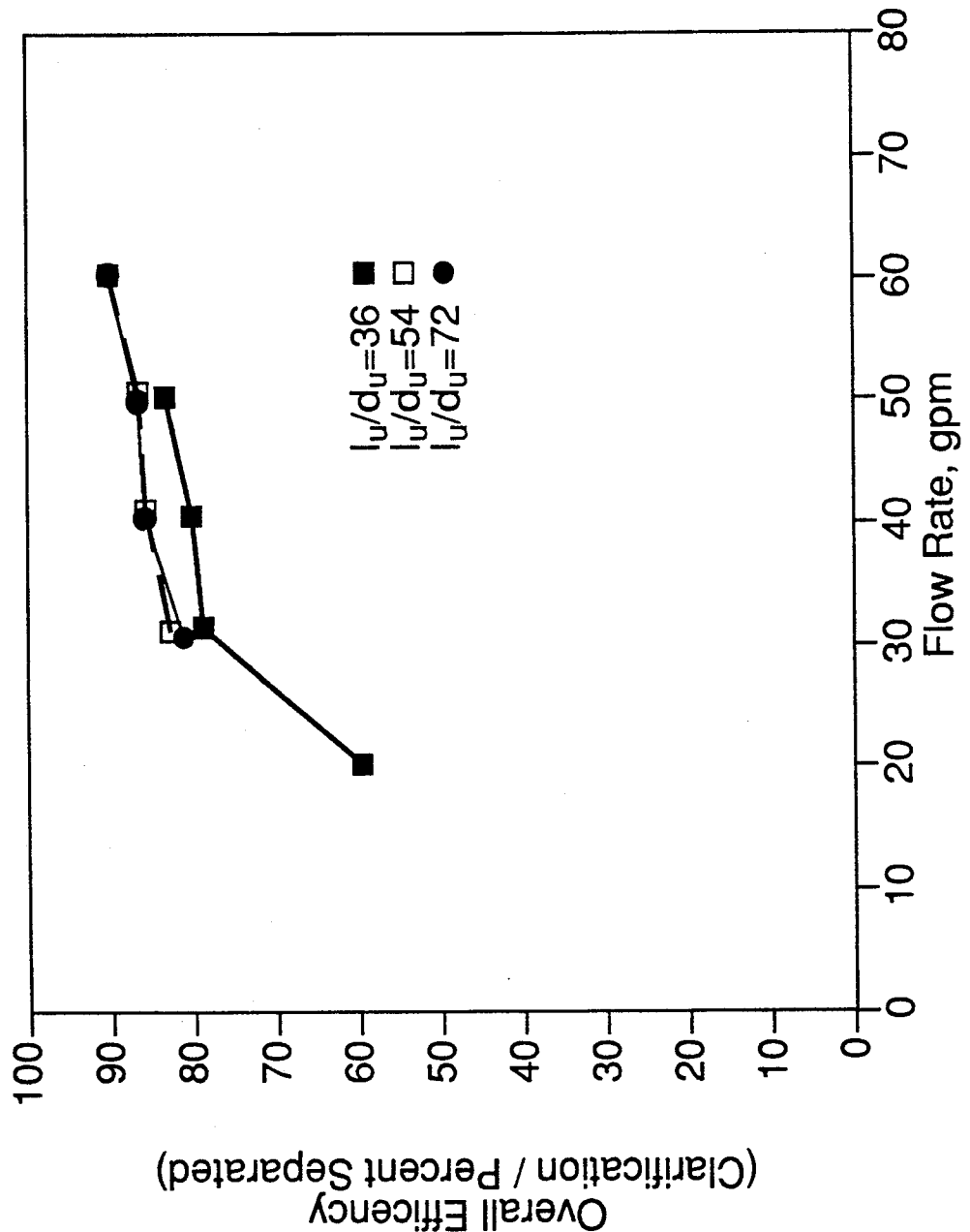
FIG. 3 illustrates the effect on separation efficiency of increasing length to diameter ratios of cylindrical tail section 18 in hydrocyclones.

FIG. 3 illustrates that increasing the $l_u/d_{ue}$ ratio above 36 significantly improves separation of oil droplets from water by the cyclones, but that already at an $l_u/d_{ue}$ ratio of 54, further increasing the $l_u/d_{ue}$ ratio does not result in further improvement in separation efficiency.

EXAMPLE II

Two hydrocyclones have the general configurations of FIGS. 1A and 2A respectively and the following characteristics $d_i/d_c = 0.25$, $\alpha_1 = 3°$, $l_u = 72''$, $d_o/d_c = 0.033$, and

|  | 1A Configuration | 2A Configuration |
| --- | --- | --- |
| $l_u/d_{ue}$ | 72 | 72 |
| $l_u/d_u$ | 72 | 96 |
| $\alpha_u$ | 0° | 6' |

The cyclones are operated with a mixture of fresh water and Level and crude, mean droplet size 16 microns. The results are shown in FIG. 4.

Figure 4:
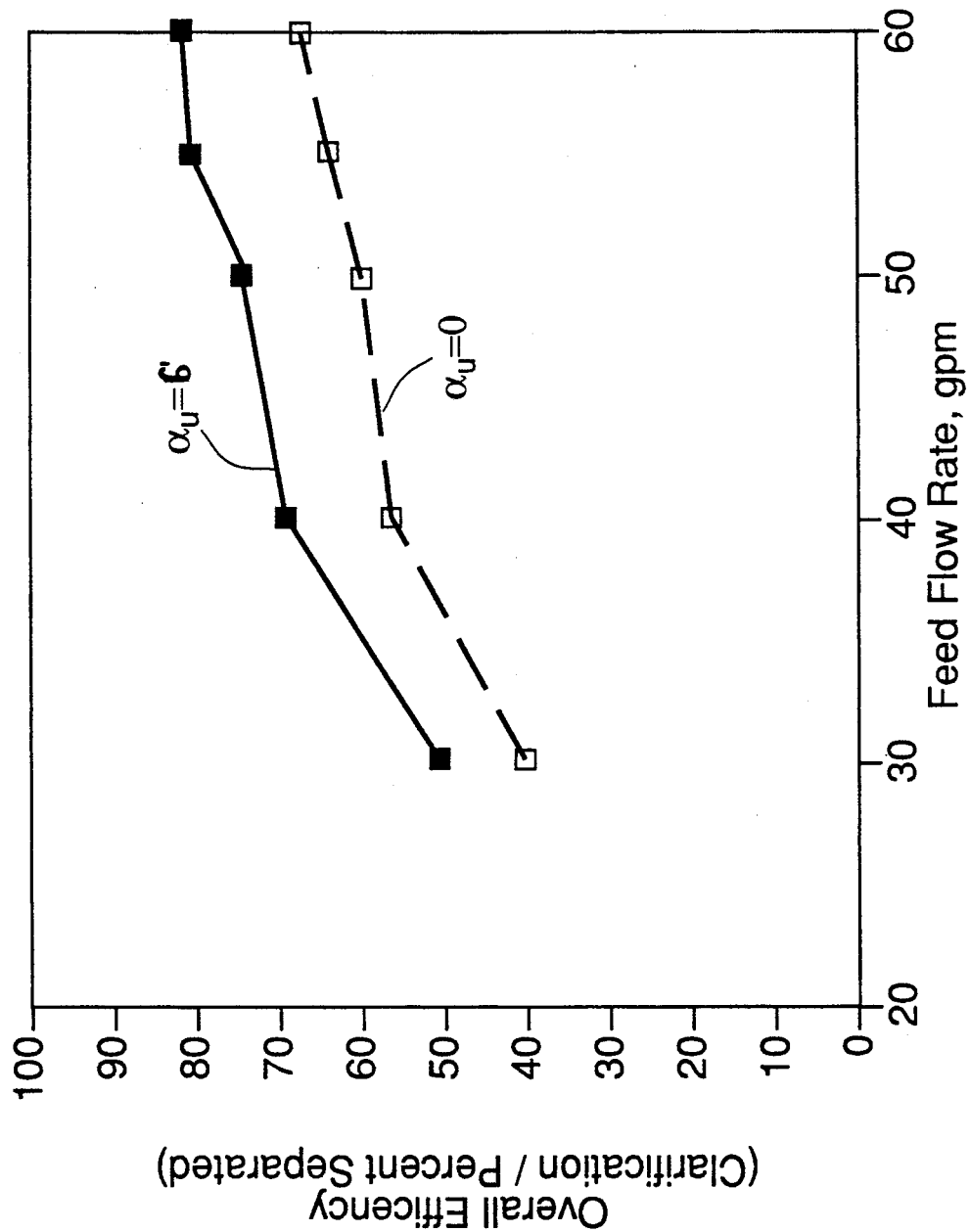
FIG. 4 illustrates the effect of a six minute (6') taper in section 18' compared to a cylindrical section 18 of zero taper.

FIG. 4 indicates that replacing the cylindrical portion 18 by a finely tapered tail section 18' having a half angle $\alpha = 6'$ significantly improves oil separation. In fact, a 6' taper increases overall efficiency by about 10 to 18 percent over the range of flow rates tested. This improvement is realized at an $l_u/d_{ue}$ ratio where, in the absence of the fine taper, increasing length $l_u$ has ceased to have any effect in improving separation.

EXAMPLE III

Two hydrocyclones have the general configurations of FIGS. 1A and 2A, except in the configuration of FIG. 2A, only a portion (30" of 54") has a slight taper of $\alpha=4'$. Other characteristics are as follows: $d_i/d_c=0.25$, $\alpha_1=3°$, $d_o/d_c=0.033$,

|  | 1A Configuration | 2A Configuration |
| --- | --- | --- |
| $l_u/d_{ue}$ | 54 | 54 |
| $l_u/d_u$ | 54 | 58 |
| $\alpha_u''$ | 0° | 4' (over initial 5/9 of section 18') |

The hydrocyclones are operated at 60 gpm flow rate over a range of oil droplet sizes (Bumpass crude in fresh water). The results are shown in FIG. 5.

Figure 5:
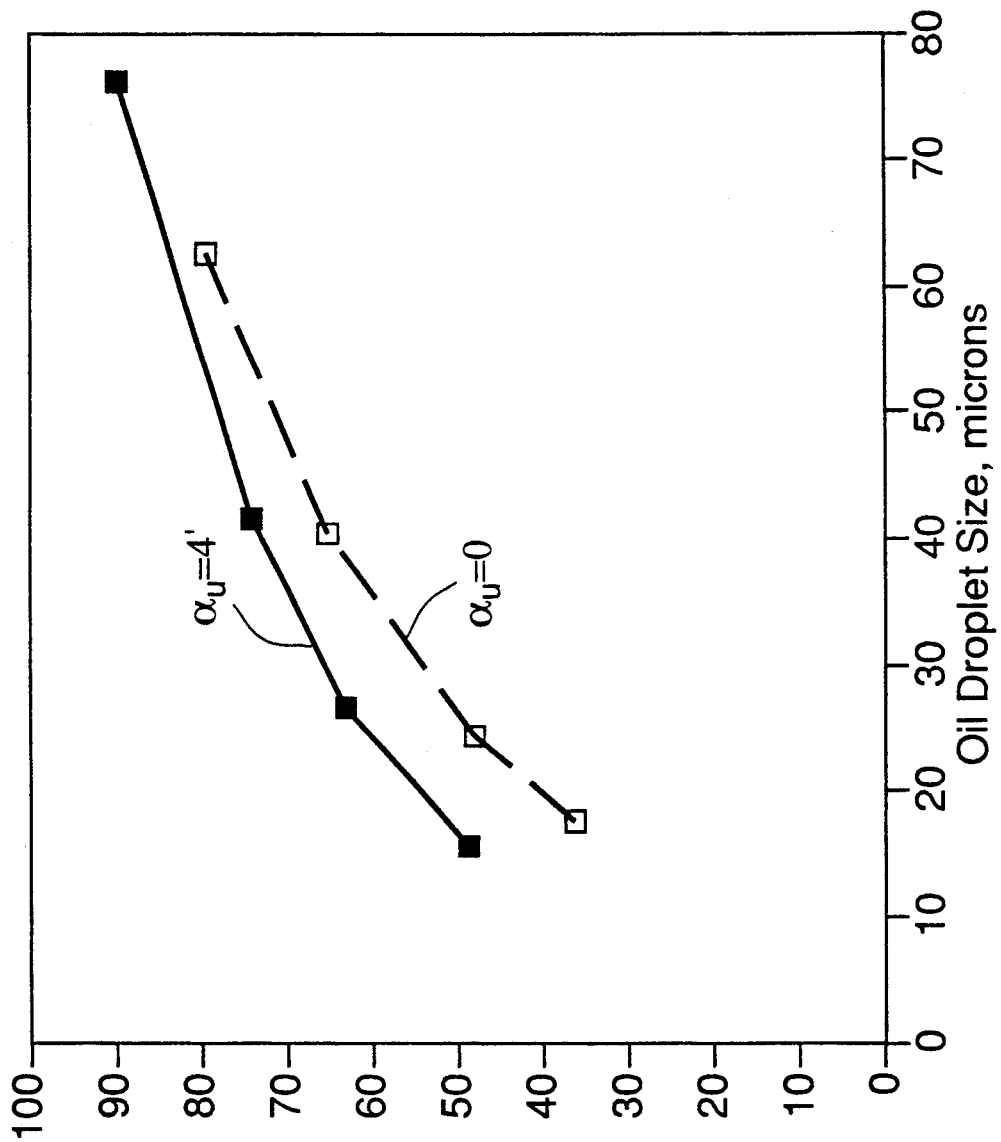
FIG. 5 illustrates the effect over a range of disperse-phase droplet sizes of a four minute (4') taper in the first portion of section 18' compared to a cylindrical section 18 of zero taper.

FIG. 5 illustrates that an extended taper of only 4' in tail piece 18 significantly improves efficiency over a range of oil droplet sizes. This improvement is attained with a hydrocyclone having $l_u$ in the range where further improvement in separation cannot be achieved by increasing $l_u$. FIG. 5 further indicates that the degree of improvement increases with decreasing droplet size. This is significant because a hydrocyclone must increasingly be effective for smaller droplet sizes as fluid moves toward the underflow outlet.

EXAMPLE IV

Two hydrocyclones have the general configuration of FIGS. 1A and 2A respectively and the following characteristics: $d_i/d_c=0.25$, $\alpha_1=3°$, $d_o/d_c=0.079$,

|  | 1A Configuration | 2A Configuration |
| --- | --- | --- |
| $l_u/d_{ue}$ | 48 | 36 |
| $l_u/d_u$ | 48 | 52 |
| $\alpha_u$ | 0° | 11' |

The hydrocyclones are operated at 13.3 gpm over a range of oil droplet sizes. The results are shown in FIG. 6.

Figure 6:
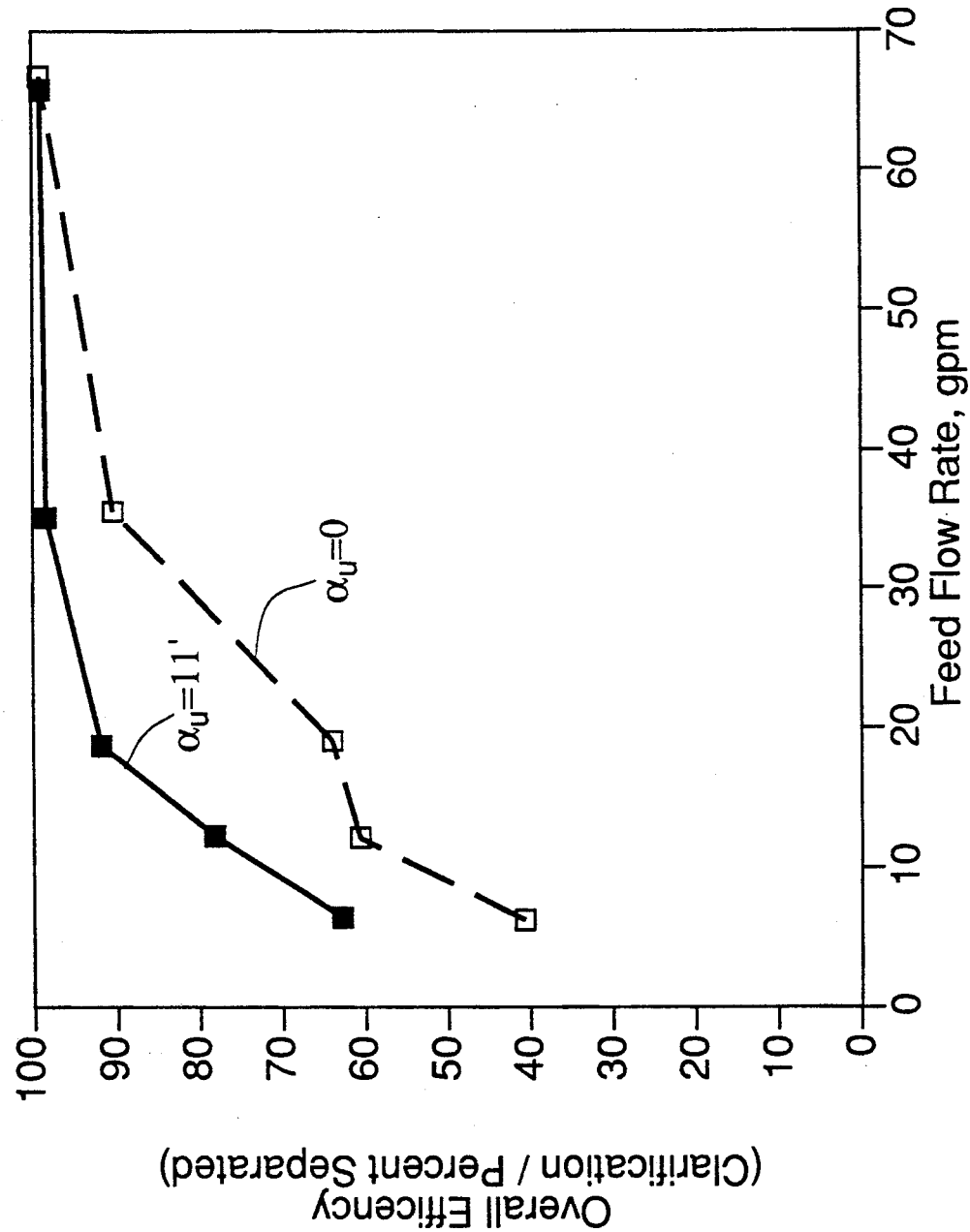
FIG. 6 illustrates the effect over a range of disperse-phase droplet sizes of an eleven minute (11') taper in section 18' compared to a cylindrical section 18 of zero taper.

FIG. 6 illustrates that a taper of 11' in tail piece 18' effectively increases performance compared to a straight tail piece 18 whose length/inlet diameter ratio is 36 and whose length/underflow outlet diameter ratio is 54. This EXAMPLE illustrates that the improvement in performance achieved by the finely tapered tail section is not limited to $l_u/d_{ue}$ ratios greater than 50. However, the taper angle $\alpha_u$ is a critical parameter for increasing separation efficiency at $l_u/d_{ue} > 50$.

EXAMPLE V

Two hydrocyclones having the general configurations of FIGS. 1A and 2A and designed to operate at maximum efficiency in the 60–70 gpm range and having the following characteristics are operated over a range of feed flow rates:

Characteristics $d_i/d_c=0.25$, $\alpha_1=320$, $d_o/d_c=0.033$,

|  | 1A Configuration | 2A Configuration |
| --- | --- | --- |
| $l_u/d_{ue}$ | 72 | 72 |
| $l_u/d_u$ | 72 | 82 |
| $\alpha_u$ | 0° | 3' |

Figure 7:
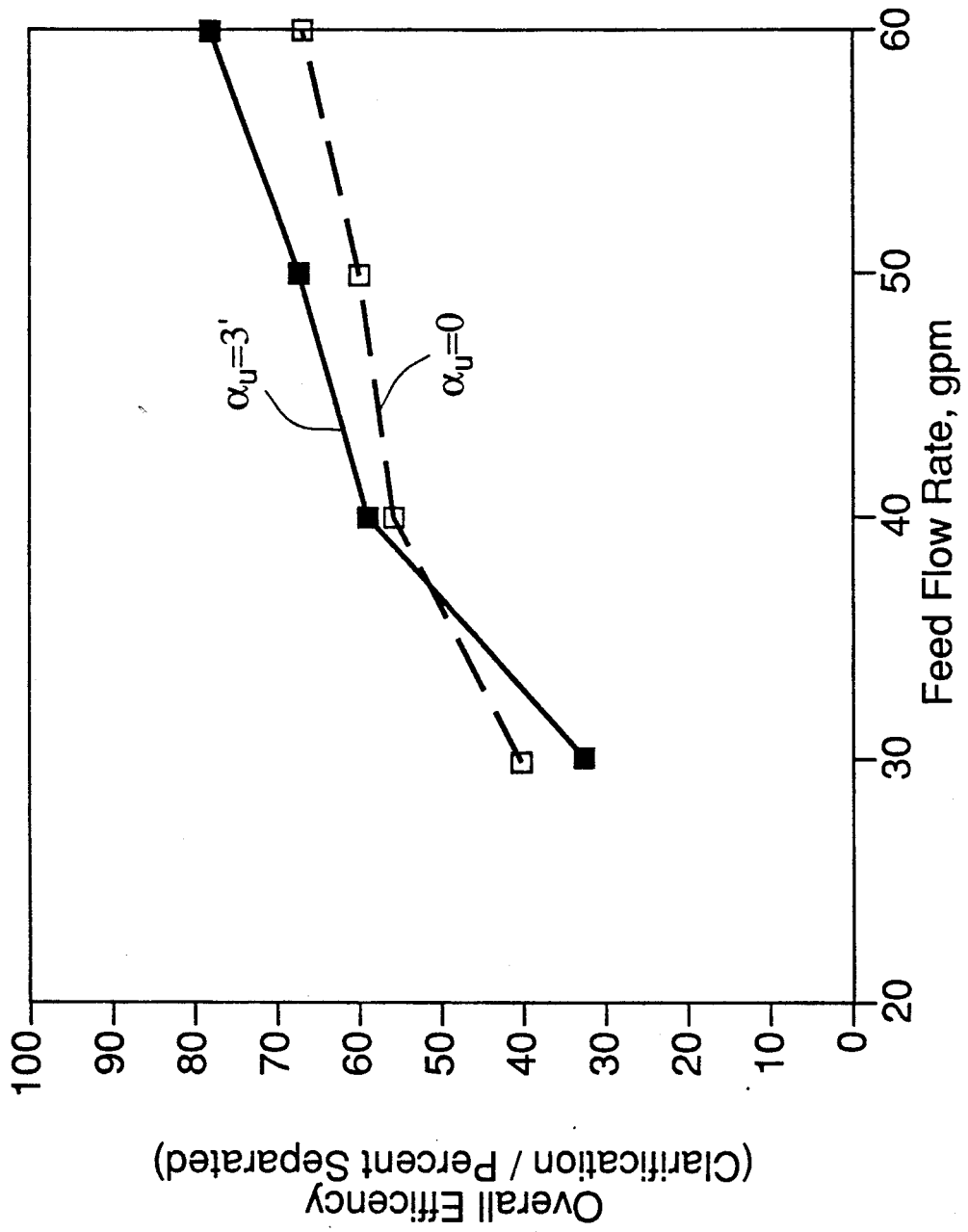
FIG. 7 illustrates the effect of a three minute (3') taper in section 18' compared to a section 18 of zero taper as flow rate approaches design flow rate.

The results are shown in FIG. 7.

FIG. 7 illustrates that a taper of only 3' in tail piece 18' significantly improves separation efficiency at the design flow rates of 60–70 gpm; and further illustrates that the results improve as flow rates approach the design flow rates.

EXAMPLE VI

Two hydrocyclones having the general configurations of FIGS. 1B and 2B respectively and the following characteristics are operated over a range of feed flow rates using Levelland crude, mean droplet size 16 microns, dispersed in fresh water: $d_i/d_c=0.30$, $\alpha_1=9.5°$, $\alpha_2=0.75°$, $d_o/d_c=0.033$,

|  | 1A Configuration | 2A Configuration |
| --- | --- | --- |
| $l_u/d_{ue}$ | 72 | 72 |
| $l_u/d_u$ | 72 | 96 |
| $\alpha_u$ | 0° | 6' |

Figure 8:
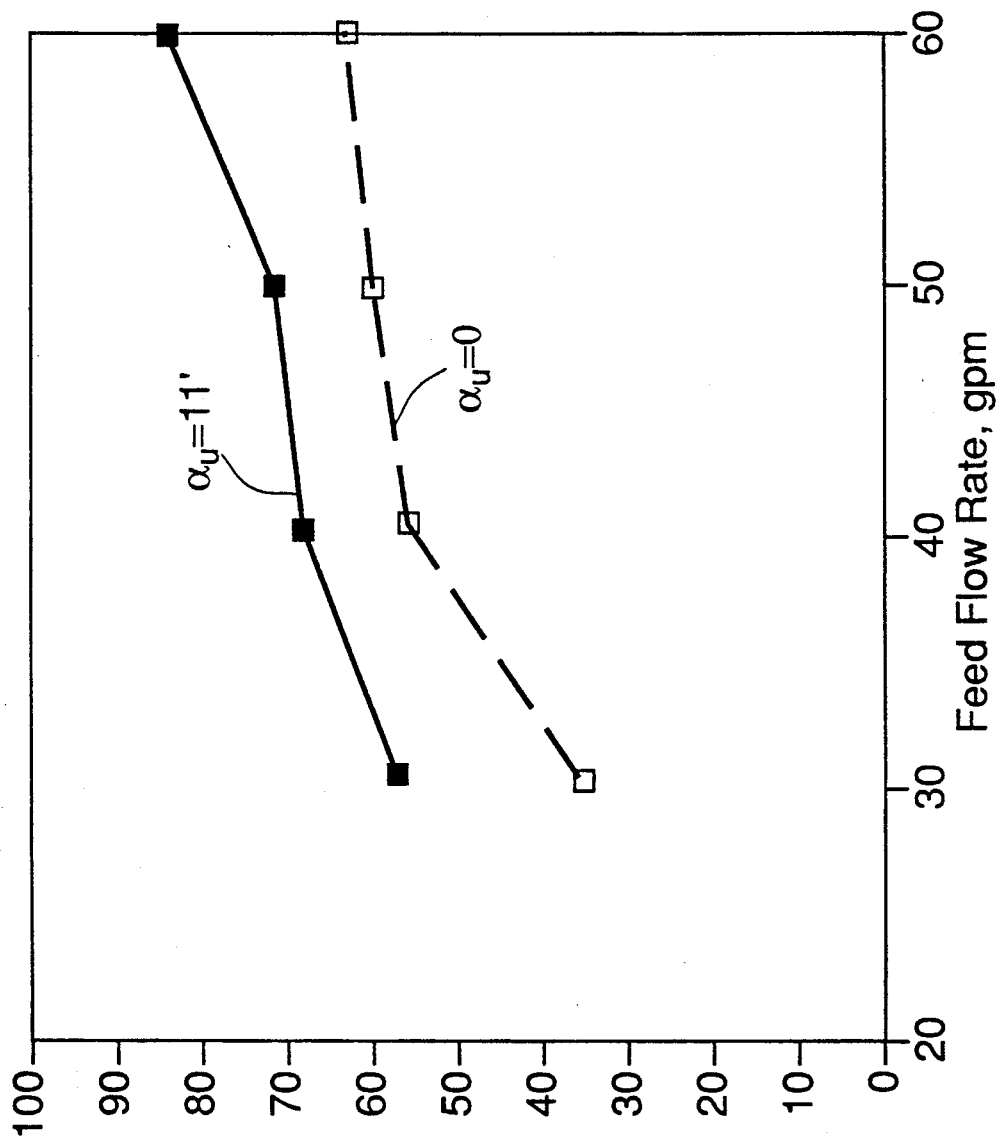
FIG. 8 illustrates the effect of an 11' taper in cylindrical section 18' of a FIG. 2B hydrocyclone compared to a zero taper in section 18 of a FIG. 1B hydrocyclone over a range of flow rates.

The results are shown in FIG. 8.

FIG. 8 illustrates that a fine taper of 6' improves performance of an elongated tail piece even after an earlier $\alpha_2$ of 45' (0.75°).

The inventors have found that a hydrocyclone separator can be designed in accordance with the above-described ratios/dimensions and for the typical oil from water separation process at the flow rates typically encountered in the offshore or onshore production of oil/gas, that a superior separation efficiency can be achieved.

The invention has been described in terms of specific and preferred embodiments but is not limited thereto, but by the attached claims interpreted in accordance with applicable principles of law.

What is claimed is:

1. A hydrocyclone comprising a separating chamber having a first end and a second end, the separating chamber comprising a tail section adjacent the second-end having an extended converging portion thereof whose interior sidewall converges in the direction of the second end toward a longitudinal axis of the separating chamber at an acute angle of convergence of from 1 to less than fifteen degree-minutes, the tail section optionally also comprising a cylindrical portion of zero angle of convergence.

2. The hydrocyclone of claim 1:
wherein the hydrocyclone further comprises an inlet portion tot the hydrocyclone adjacent the first-end thereof, the inlet potion comprising a vortex finger, the vortex finder having a length within he hydrocyclone approximately equal to the length of the inlet portion to the hydrocyclone.

3. The hydrocyclone of claim 1 further comprising: a choke at an underflow-outlet end of the tail section.

4. The hydrocyclone of claim 3 wherein:
the choke has a length o less than ⅓ of the tail section and is characterized by a reduction in underflow diameter of at least 1/10.

5. The hydrocyclone of claim 3:
wherein the choke has a length of less than 1/6 of the length of the tall section and is characterized by a reduction in underflow diameter of at least 1/10.

6. The hydrocyclone of claim 5:
wherein the choke is characterized by a reduction in underflow diameter of at least 1/5.

7. The hydrocyclone of claim 1 wherein the tail section has a length to entrance diameter ratio of greater than 30.

8. The hydrocyclone of claim 1 wherein the tail section has a length to entrance diameter ratio of greater than 50.

9. The hydrocyclone of claim 8 wherein the extended converging portion is situated on a first-end side of the tail section at or before a point there where the length to entrance diameter ratio first exceeds 50.

10. The hydrocyclone of claim 1 wherein the tail section has a length to entrance diameter ratio in a range where extending the length of a corresponding cylindrical tail section does not enhance separation efficiency.

11. The hydrocyclone of claim 10 wherein the extended converging portion is situated on a first-end side of the tail section at or before a point thereon where further length of a cylindrical tail section does not enhance separation efficiency.

12. The hydrocyclone of claim 1
wherein the extended converging portion comprises at least one-third of the tail section.

13. The hydrocyclone of claim 1
wherein the extended converging portion comprises at least one-half of the tail section.

14. The hydrocyclone of claim 1
wherein the extended converging portion comprises substantially all of the tail section.

15. The hydrocyclone of claim 1
wherein the angle of convergence is in the range of 1 degree-minute to 11 degree-minutes.

16. The hydrocyclone of claim 1 range of 3 degree-minutes to 11 degree-minutes.

17. The hydrocyclone of claim 1 wherein the separating chamber comprises first, second, third and fourth portions,
the first portion being a generally cylindrical portion adjacent the first end having a fluid inlet thereunto, and the first end having an overflow outlet therein;
the second portion being a generally frustoconical portion continuous with the first portion and converging in the direction of the second end and having an angle of convergence relative to the longitudinal axis of between 1.5 and 15 degrees;
the third portion being a generally furstoconical portion continuous with the second portion and converging in the direction of the second end and having an angle of convergence relative to the longitudinal axis of less than 2 degrees; and
the fourth portion being a generally furstoconical portion continuous with the second portion and converging from an entrance end thereof towards the second end and having an angle of convergence relative to the longitudinal axis of between 1 and less than 15 degree-minutes.

18. The hydrocyclone of claim 17 having the following general characteristics:

$d_o < d_u < d_c$ $0.1 \leq d_i/d_c \leq 0.5$ $0.01 \leq d_o/d_c 0.2$ $0 \leq l_c/d_c = 2.0$ $0.1 d_u/d_c 0.5$ $1.5° \leq a_2 \leq 15°$ $20' \leq a_2 \leq 2°$ $1' \leq a_u < 15'$ $50 < l_u/d_{ue}$ 19. The hydrocyclone of claim 1 wherein the separating chamber comprises first, second and third portions,
the first portion being a generally cylindrical portion adjacent the first end having a fluid inlet thereunto, and the first end having an overflow outlet therein;
the second portion being a generally furstoconical portion continuous with the first portion and converging in the direction of the second end and having an angle of convergence relative to the longitudinal axis of between 1.5 and 15 degrees;
the third portion being a generally furstoconical portion continuous with the second portion and converging towards the second end and having an angle of convergence relative to the longitudinal axis of between 1 and less than 15 degree-minutes;.

20. The hydrocyclone of claim 19 having the following characteristics:

$d_o < d_u < d_c$ $0.1 \leq d_i/d_c 0.5$ $0.01 \leq d_o/d_{cc} \leq 0.20$ $0 \leq l_c/d_c = 2.0$ $0.1 \leq d_u/d_c 0.5$ $1.5° \leq a_1 \leq 15°$ $1' \leq a_u < 15'$ $50 < l_u/d_{ue}$

* * * * *